United States Patent [19]

Draper

[11] Patent Number: 4,805,843
[45] Date of Patent: Feb. 21, 1989

[54] FOOD GRATER HOLDER

[76] Inventor: A. Allen Draper, 3860 S. Midland, Roy, Utah 84067

[21] Appl. No.: 102,887

[22] Filed: Sep. 30, 1987

[51] Int. Cl.$^4$ .............................................. B02C 23/00
[52] U.S. Cl. ...................................... 241/287; 16/252; 16/340; 16/382; 241/95; 241/101.2; 241/273.1; 248/359 F
[58] Field of Search ............ 241/95, 89, , 89.1, 241/101.2, 168, 273.1, 273.2, 273.4, 274, 285 R, 286, 287; 16/252, 382, 383, 340, 342; 99/510; 248/291, 359 F

[56] References Cited

U.S. PATENT DOCUMENTS

| 520,548 | 5/1894 | Tobey et al. | 16/340 |
| 555,834 | 3/1896 | Taylor | 241/95 |
| 1,139,193 | 5/1915 | Kirschner | 16/340 |
| 1,476,966 | 12/1923 | Hachmann | 16/252 |
| 3,317,225 | 5/1967 | Cooper | 248/291 X |

FOREIGN PATENT DOCUMENTS 101417  2/1984  European Pat. Off. ............ 241/95

Primary Examiner—Joseph M. Gorski
Attorney, Agent, or Firm—A. Ray Osburn

[57] ABSTRACT

A food grater attachment which facilitates the use of a grater with receptacles of various sizes and shapes. The grater may be installed in a frame which is hinged to a clip for engaging the wall of the receptacle. The hinge incorporates locking provisions so that the frame and grater may be immobilized in selected inclined positions so that the grater is entirely over the mouth of the bowl or other receptacle.

1 Claim, 3 Drawing Sheets

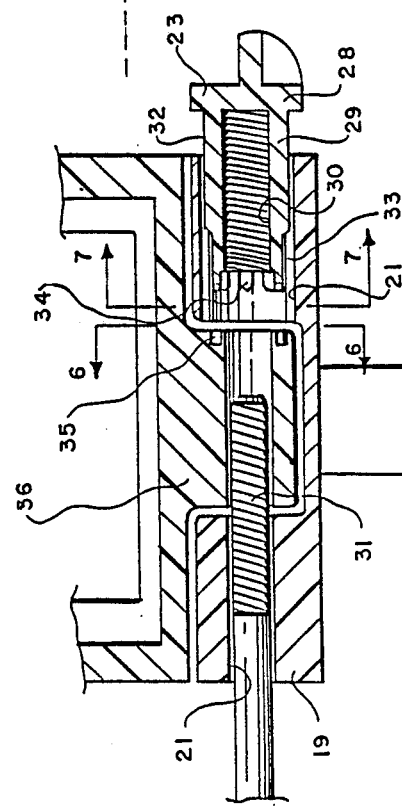
FIG. 7
FIG. 8
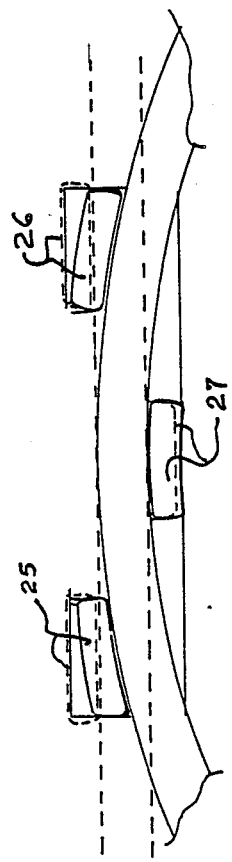
FIG. 6
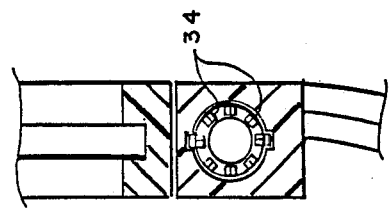
FIG. 4
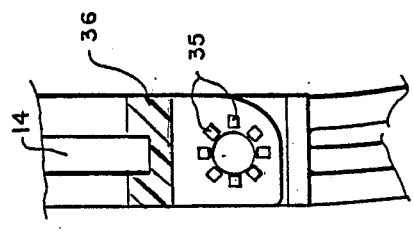
FIG. 5
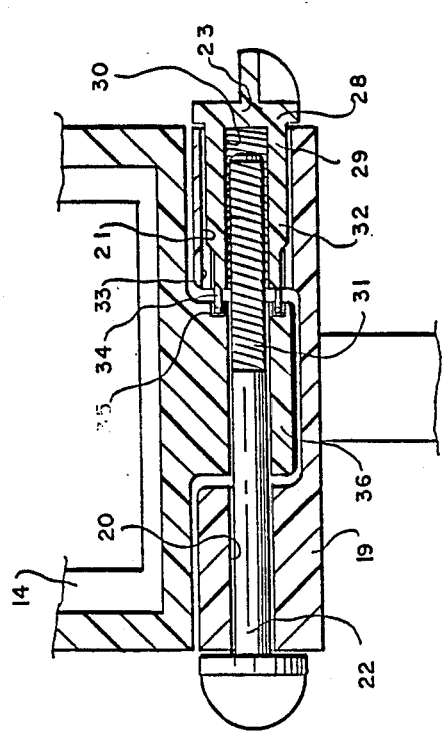

FOOD GRATER HOLDER

BACKGROUND OF THE INVENTION

1. Field:

The field of the invention is kitchen accessories, and more particularly such accessories for facilitating the use of food graters.

2. State of the Art:

Various approaches have been used to facilitate the use of food graters in conjunction with bowls, pans and other receptacles for the grated food. In some instances, attaching clips or the like have been provided integrally with the bodies of the graters to fasten the graters to the uppoer rims of the receptacles. In other instances, auxiliary fastening and positioning devices have been provided. Some food processing devices comprise combinations of the grater and the receptacle. Examples of the first approach include U.S. Pat. No. 2,447,714, wherein wire clips 4 and 7 hold the grater across the mouth of a bowl. U.S. Pat. No. 2,601,087, while lacking positive gripping clips, has downward projecting positioning members 17. U.S. Pat. No. 555,834 discloses a grater holder with a retractable clip to engage one side of the rim of a flat pan. U.S. Pat. No. 3,583,455 reveals a grater having three elements to approximate a conical shape fitting upon the rim of a receptacle bowl. U.S. Pat. Nos. 2,720,234, 2,615,486, and 2,714,908 all disclose specialized receptacle/grater combinations. The graters are adapted for use only with particular specialized receptacles. None of the prior devices facilitate the use of a single grater with a variety of receptacles. In the typical residential kitchen, available bowls or pans are typically too large or too small for the grater so that it cannot easily be used.

BRIEF SUMMARY OF THE INVENTION

With the foregoing in mind, the present invention eliminates or substantially alleviates the disadvantages of the prior art by providing a food grater holder with which a grater is useable with a wide range of receptacle sizes and shapes. The device comprises a grater holding frame, a clip for detachably grasping the wall of the bowls, e.g., and a hinge connecting the frame and the clip. The clip is adapted for use with a wide range of bowl and pan sizes, wall thicknesses and curvatures. Preferably, the clip is open ended at the bottom and constructed of resilient fingers, so that it can be pressed onto the walls of the receptacles. For larger bowls, the grater holder frame is rotated about the hinge to rest horizontally across the width of the bowl, into which the grated food falls. For smaller bowls or pans, the frame is rotated into an inclined position, so that the grater remains entirely over the bowl, and the grated food falls again into the bowl. The hinge may comprise a pin and bore, or a flexible strip live hinge may be employed. In either event, means are preferably provided to stabilize the frame in the inclined position for use. According to one aspect of the invention, a pin type hinge is utilized with selective locking positions. According to another aspect, a pivotal support member may be provided to span between the frame and the wall of the bowl opposite the clip.

It is therefore the object of the invention to provide a receptacle attaching means for food graters which facilitates the use of the grater with receptacles of a large range of sizes, wall thicknesses and shapes.

BRIEF DESCRIPTION OF THE DRAWINGS

In the drawings, which represent the best mode presently contemplated for carrying out the invention.

FIG. 6 a view of the fragment of FIG. 5, taken along line 6—6 thereof, drawn to the same scale, and FIG. 7 a view of the fragment of FIG. 5, taken along line 7—7 thereof, drawn to the same scale, and FIG. 8 a schematic representation of the manner in which the fingers of the attaching clip adjust to receptacles of varying curvatures.

DETAILED DESCRIPTION OF ILLUSTRATED EMBODIMENTS

Figure 1:
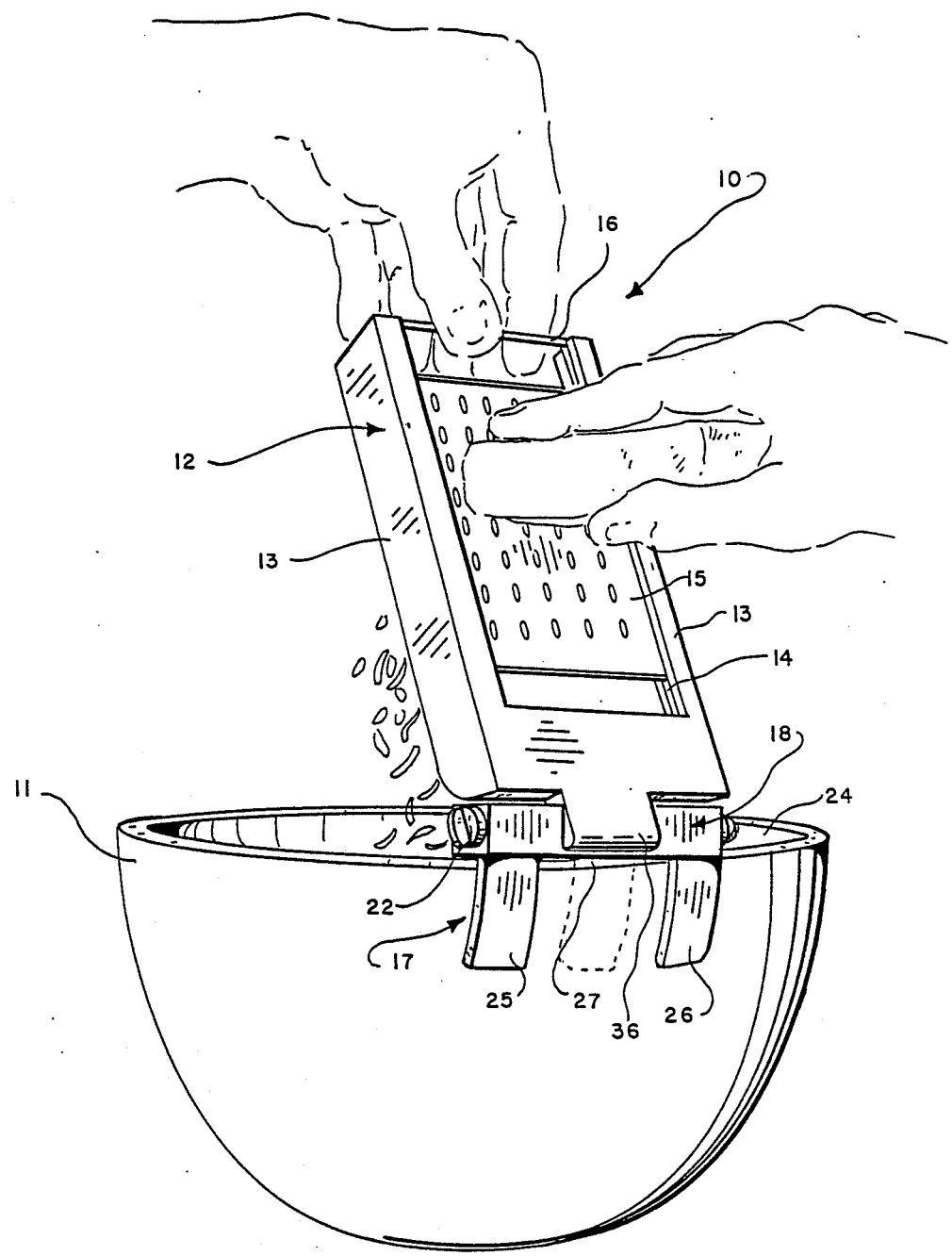
FIG. 1 is a perspective view of a food grater holder in accordance with the invention in use clipped to a receptacle bowl, drawn to a somewhat reduced scale, FIG. 2 an elevation view of the grater holder of FIG. 1, with a grater being inserted into the slots thereof, drawn to approximately the same scale, FIG. 3 a side elevation view of the grater holder of FIG. 2, with a selected inclined position indicated by dashed lines, FIG. 4 a vertical sectional view of a fragment of the grater holder of FIG. 2, showing the hinge pin and locking nut, drawn to substantially full scale, FIG. 5, the sectional view of FIG. 4, with the hinge pin and locking nut disengaged for selection of inclined position of the grater holder, drawn to the scale of FIG. 4.
Figure 3:
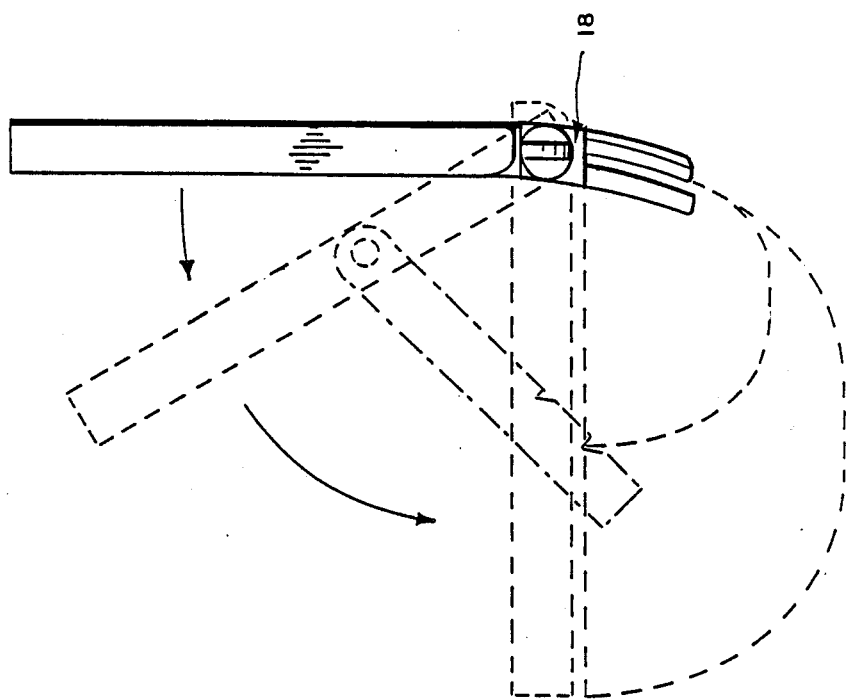
Figure 2:
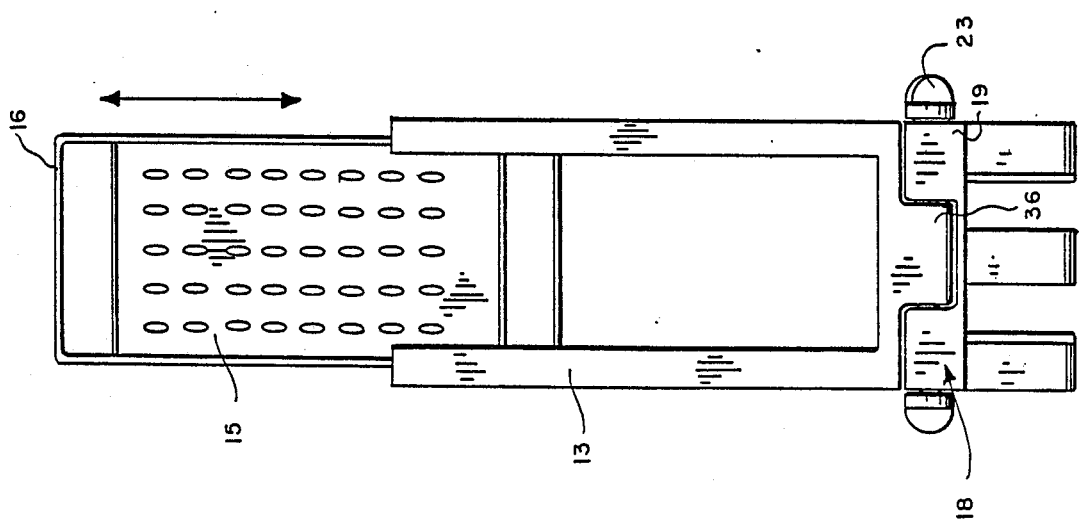

In FIG. 1, grater holder assembly 10 is secured to the rim of a bowl 11. Grater holder 10 comprises a frame 12 with side members 13 carrying slot 14 for insertion of grater 15. Frame cross member 16 may be gripped to steady frame 12 during use. An attachment clip 17 is secured to the bowl end of frame 12 by a hinge 18. Versatile clip 17 and hinge 18 enable grater 15 to be used with receptacles of widely ranging size and shape. (FIGS. 3 & 8)

Clip 17 comprises backbone member 19 with bores 20 and 21, end-threaded pin 22 and locking nut 23. Wall 24 of receptacle 11 is gripped between outside fingers 25 and 26 and inside finger 27. Although all the fingers 25, 26 and 27 are preferably elastic to conform to various sized walls, considerable adaptability to various size receptacles remains with rigid constructioon. (FIGS. 2-7) Note that even the straight walls of a rectangle receptacle are within the range of accommodation of clip 17. (FIG. 8) Locking nut 23 comprises a head 28 and a stem 29. Threaded internal bore 30 accepts external threads 31 on hinge pin 22. A pair of splines 32 longitudinally along a portion of stem 29 engage internal keyways 33 of bore 21 in clip backbone 19 to prevent rotation of locking nut 23. A plurality of indexing projections 34 extend in the axial direction from the end of stem 29. An equal number of indexing recesses 35 are provided in the adjacent end of frame connected hinge arm 36. To lock frame 12 into selected inclined position above receptacle 11, locking nut 23 is thrust against hinge arm 36, projections 34 engaging recesses 35. Hinge pin 18 is then rotated to secure locking nut 23 into position by engagement of threads 31 with internal threads of bore 30. The hinge is in all its parts constructed for generous clearances to facilitate disassembly for cleaning purposes.

The adaptable grater holder 10 may be embodied in ways other than illustrated herein. For example, the locking provisions for hinge 18, although preferred and desirable, are not essential to the invention. Frame 12 may be held in the required inclined position with a loose hinge 18 by a hand of the user, as indicated in FIG. 1. Other types of hinge 18 may be employed, such as a live hinge (not illustrated) comprising a strip of flexible material connecting frame 12 with clip 17. Frame 12 could be stabilized in inclined position by utilizing a loose hinge in combination with a pivoted support member as indicated in dashed lines in FIG. 3. The support member could have spaced notches to accommodate different angles of inclination.

The invention may be embodied in other specific forms without departing from the spirit or essential characteristics thereof. The present embodiment are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A food grater holder comprising:
    a frame with provisions for the mounting thereon of a food grater;
    a clip adapted to simultaneously engage both inside and outside vertical surfaces of an upstanding wall of a grated food receptacle;
    a hinge connecting the frame and the clip, the hinge permitting substantial rotation of the frame thereabout upwardly from and downwardly towards the receptacle;
    means positively immobilizing the frame in selected inclined position with respect to the receptacle, the frame immobilizing means comprising provisions for releasably locking the frame against rotation about the hinge; wherein the hinge includes the provisions preventing rotation of the frame, said hinge comprising;
    an uppermost portion of the clip having a horizontal bore, the wall of said bore having at least one keyway extending along the length thereof;
    an end portion of the frame carrying a horizontal bore therethrough axially aligned with the clip bore, said frame and portion having also a multiplicity of indexing notches spaces circumferentially around the frame bore at an end thereof adjacent the clip;
    a hinge pin disposed through the frame bore, having an externally threaded end portion extending into the clip bore, and an enlarged head member at its opposite end; and
    a locking sleeve disposed in the clip bore, an outer wall thereof having a radially outwardly extending key in engagement with the at least one keyway, an internal axial bore of the sleeve having internal threads engaged with the threads of the pin, and the outer wall of the sleeve having at least one indexing projection engaged with the indexing notches.

* * * * *